US009439194B2

(12) United States Patent
Jain et al.

(10) Patent No.: US 9,439,194 B2
(45) Date of Patent: Sep. 6, 2016

(54) METHOD FOR ROBUST REAL-TIME WIRELESS INDUSTRIAL COMMUNICATION

(71) Applicant: Robert Bosch GmbH, Stuttgart (DE)

(72) Inventors: Vivek Jain, Mountain View, CA (US); Junseok Kim, Tucson, AZ (US); Matthias Bauer, Nuremberg (DE); Gunther May, Karlstadt (DE)

(73) Assignee: Robert Bosch GmbH, Stuttgart (DE)

(*) Notice: Subject to any disclaimer, the term of this patent is extended or adjusted under 35 U.S.C. 154(b) by 264 days.

(21) Appl. No.: 14/210,864

(22) Filed: Mar. 14, 2014

(65) Prior Publication Data

US 2014/0269560 A1    Sep. 18, 2014

Related U.S. Application Data

(60) Provisional application No. 61/788,389, filed on Mar. 15, 2013.

(51) Int. Cl.
| H04W 4/00 | (2009.01) |
| H04W 72/04 | (2009.01) |
| H04L 5/00 | (2006.01) |
| H04W 84/18 | (2009.01) |

(52) U.S. Cl.
CPC ............ *H04W 72/0453* (2013.01); *H04L 5/00* (2013.01); *H04W 84/18* (2013.01)

(58) Field of Classification Search
CPC ..................................................... H04W 28/04
USPC ......................................................... 370/329
See application file for complete search history.

(56) References Cited

U.S. PATENT DOCUMENTS

| 7,835,339 B1 | 11/2010 | Benveniste | |
| 8,160,189 B2 | 4/2012 | Wurzbach et al. | |
| 8,654,718 B2 * | 2/2014 | Kwak | H04L 5/0007 370/329 |
| 2002/0019233 A1 | 2/2002 | Leung et al. | |
| 2004/0136393 A1 * | 7/2004 | Riveiro Insua | H04B 3/54 370/432 |
| 2006/0146721 A1 | 7/2006 | Attar et al. | |
| 2007/0097942 A1 * | 5/2007 | Gorokhov | H04B 7/2656 370/342 |
| 2007/0121546 A1 * | 5/2007 | Zuckerman | H04L 5/023 370/329 |
| 2007/0263702 A1 * | 11/2007 | Kwon | H04L 1/1812 375/135 |

(Continued)

FOREIGN PATENT DOCUMENTS

| JP | 2010-130110 A | 6/2010 |
| JP | 2012-105036 A | 5/2012 |
| WO | 2011116858 A1 | 9/2011 |

OTHER PUBLICATIONS

International Search Report and Written Opinion corresponding to PCT Application No. PCT/US2014/027327, mailed Jul. 30, 2014 (10 pages).

*Primary Examiner* — Christopher R Crompton
(74) *Attorney, Agent, or Firm* — Maginot, Moore & Beck, LLP

(57) ABSTRACT

Methods for operating real-time wireless networks enable robust medium access strategies for communicating nodes in the network. A given wireless channel is divided into several sub-carriers, with each node assigned to a subset of sub-carriers. A master wireless node uses different subsets of the sub-carriers to communication with two or more slave wireless nodes simultaneously. The method includes generation of preambles that are robust to interference and multipath conditions. The method also enables communication within a maximum predetermined latency bound.

14 Claims, 8 Drawing Sheets

(56) References Cited

U.S. PATENT DOCUMENTS

| | | |
|---|---|---|
| 2008/0285526 A1 | 11/2008 | Gorokhov et al. |
| 2009/0150537 A1 | 6/2009 | Fanson |
| 2009/0238293 A1 | 9/2009 | Bhatti et al. |
| 2009/0252203 A1* | 10/2009 | Goldhamer ............ H04B 7/026 375/211 |
| 2010/0054223 A1 | 3/2010 | Zhang |
| 2010/0061326 A1 | 3/2010 | Lee et al. |
| 2010/0271991 A1 | 10/2010 | Kimura et al. |
| 2012/0176990 A1 | 7/2012 | Zou |

* cited by examiner

METHOD FOR ROBUST REAL-TIME WIRELESS INDUSTRIAL COMMUNICATION

CLAIM OF PRIORITY

This application claims priority to U.S. Provisional Application No. 61/788,389, which is entitled "Method for Robust Real-Time Wireless Industrial Communication," and was filed on Mar. 15, 2013, the entire contents of which are hereby incorporated by reference herein.

TECHNICAL FIELD

This disclosure relates generally to the field of wireless communication and, more specifically, to wireless communication systems that are configured to send messages within real-time communication restraints.

BACKGROUND

Real-time communication systems include communication systems that guarantee delivery of communication message data within predetermined time limits. Real-time communication systems are used in a wide range of applications, with industrial control systems being one example where real-time communications are important to the successful operation of manufacturing, control, automation, and other industrial processes.

Many existing real-time industrial applications use wired communication and specialized protocols to achieve latency and reliability. Wired solutions are, however, expensive and error prone as wired cables are susceptible to electromagnetic interference from the high voltage currents used to drive industrial devices. The wired networks can include several hundred devices controlled by single/multiple controllers. Further, faulty cabling often results in errors that incur costs due to lost productivity and increased maintenance requirements.

Wireless solutions have the advantage of cleaner and easier installation. Wireless solutions that operate in the 1 GHz or greater range have reduced susceptibility to electromagnetic interference from most industrial equipment. However, existing wireless communication systems are not suitable for the real-time operational requirements of industrial applications that include real-time communication requirements between multiple devices. For example, existing orthogonal frequency division multiplexing (OFDM) systems employed in standard wireless technologies, such as 802.11g/n, cannot support the strict latency and reliability requirements, although some existing protocols support relaxed soft-real-time requirements using enhancements such as an extension for Quality of Service (QoS) with 802.11e and other medium access protocols. Additionally, OFDM and code division multiple access (CDMA) techniques that are used with cellular data networks are typically unsuitable for use in industrial automation systems due to increased protocol complexity and equipment cost. Consequently, improved systems and methods for wireless communication that enable real-time operation would be beneficial.

SUMMARY

In one embodiment, a network includes a master wireless node (network controller) that communicates with a plurality of slave wireless nodes (such as drives, sensors, actuators). The master wireless node periodically send messages to these slave wireless nodes and expects their response within a given cycle duration, which may range from hundreds of microseconds to several milliseconds. A modified orthogonal frequency division multiple access (OFDMA) protocol enables the master wireless node to maintain synchronization with the plurality of slave wireless nodes and to enable the slave wireless nodes to maintain synchronization with each other to satisfy latency requirements of a real-time wireless communication system.

In another embodiment, a method for wireless communication between a master wireless node and multiple slave wireless nodes has been developed. The method includes generating with a first controller in a master wireless node a first allotment of sub-carriers selected from a predetermined frequency band for communication with a first slave wireless node, the first allotment of sub-carriers including at least two orthogonal sub-carriers, generating with the first controller in the master wireless node a second of allotment of sub-carriers selected from the predetermined frequency band for communication with a second slave wireless node, the second allotment of sub-carriers including at least two orthogonal sub-carriers that are different than the at least two orthogonal sub-carriers in the first allotment, and transmitting with the master wireless node a first message to the first slave wireless node using only the first allotment of sub-carriers and a second message to the second slave wireless node using only the second allotment of sub-carriers, the first message being different than the second message and the transmission of the first message and the second message occurring substantially simultaneously.

In another embodiment, a wireless communication system that includes a master wireless node and multiple slave wireless nodes has been developed. The system includes a first slave wireless node, a second slave wireless node, and a master wireless node. The master wireless node includes a first transceiver configured to transmit data to the first slave wireless node and the second slave wireless node and receive data from the first slave wireless node and the second slave wireless node, and a first controller operatively connected to the first transceiver. The first controller is configured to generate a first allotment of sub-carriers selected from a predetermined frequency band for communication with the first slave wireless node, the first allotment of sub-carriers including at least two orthogonal sub-carriers, generate a second of allotment of sub-carriers selected from the predetermined frequency band for communication with the second slave wireless node, the second allotment of sub-carriers including at least two orthogonal sub-carriers that are different than the at least two orthogonal sub-carriers in the first allotment, and transmit a first message to the first slave wireless node using only the first allotment of sub-carriers and a second message to the second slave wireless node using only the second allotment of sub-carriers, the first message being different than the second message and the transmission of the first message and the second message occurring substantially simultaneously.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term orthogonal frequency division multiple access (OFDMA) refers to a method of transmitting data in a wireless communication system that includes a plurality of orthogonal sub-carriers that are formed in a larger frequency band of the electromagnetic spectrum. An OFDMA communication system arranges the orthogonal sub-carriers with a sufficient separation in the frequency spectrum between the respective sub-carriers to enable transmission of data symbols through the sub-carriers in an orthogonal manner. That is to say, the attenuation between the frequency bands of the different orthogonal sub-carriers is adequate to enable successful simultaneous transmission of symbols in each of the orthogonal sub-carriers without interference between the orthogonal sub-carriers. As used herein, the term "symbol" refers to a set of data that are communicated over a wireless channel where a radio receiver can decode the symbol into useful information. In one embodiment, a symbol is a single binary bit having two distinct values (e.g. 0 or 1), while other embodiments include more complex symbols including symbols that are represented using multiple bits of binary data. As used herein, the term "message" refers to a sequence of one or more symbols that are transmitted from a master wireless node to a slave wireless node or from a slave wireless node to a master wireless node for data transmission and reception in a wireless radio system.

Figure 1:
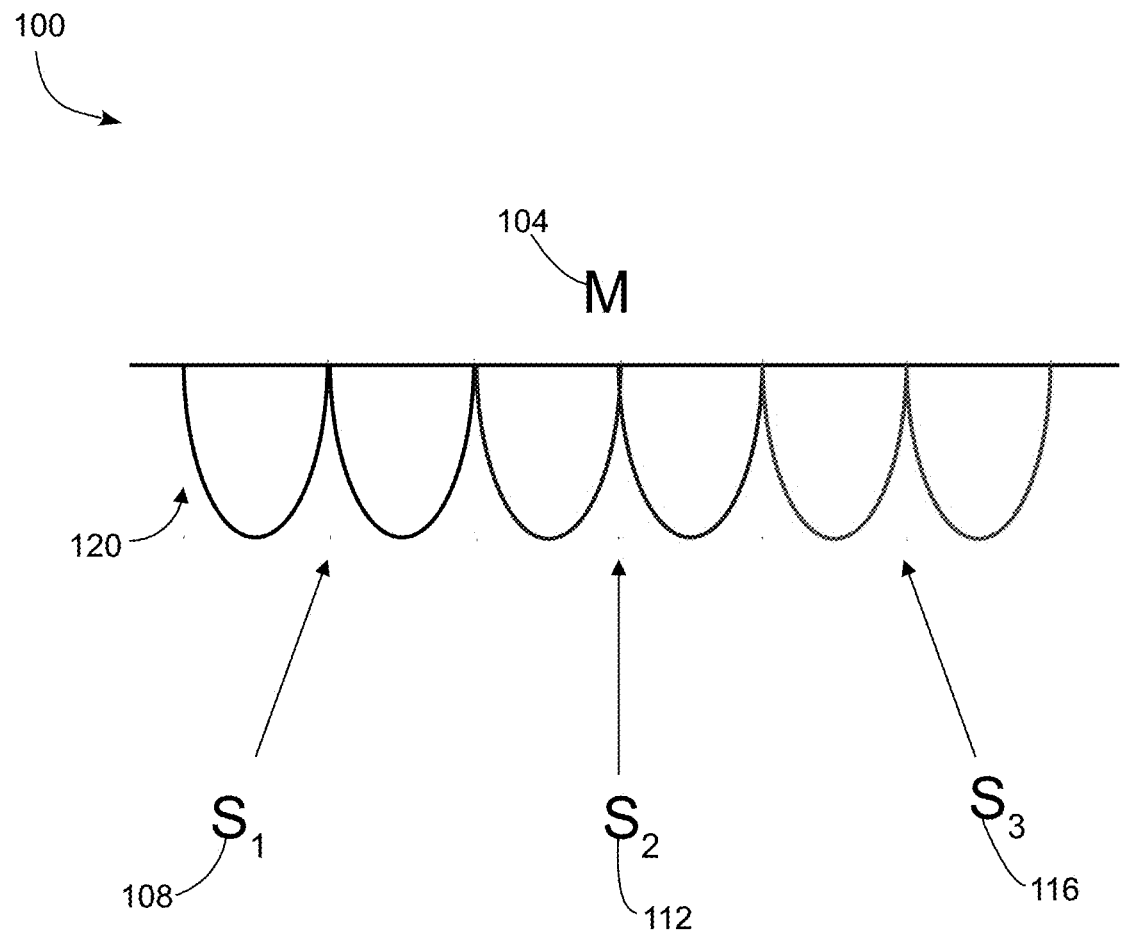
FIG. 1 is a schematic diagram of a wireless communication system.

FIG. 1 depicts a wireless communication system 100 including a master wireless node (M) 104 and three slave wireless nodes 108 ($S_1$), 112 ($S_2$), and 116 ($S_3$). As used herein, the term "master wireless node" refers to a node in a wireless communication system that is configured to transmit and receive data from multiple wireless nodes and to transmit commands to control the activities of the other wireless nodes. The term "slave wireless node" refers to one of the wireless nodes that is in communication with the master wireless node. The slave wireless nodes typically have an operating mode where each slave wireless node communicates only with the master wireless node. In the configuration of the system 100, the master wireless node 104 is configured to transmit data to the slave wireless nodes 108-116 using a plurality of orthogonal sub-carriers 120. The orthogonal sub-carriers 120 are centered at different frequencies in the electromagnetic spectrum to enable the master wireless node 104 to send symbols corresponding to data using each of the orthogonal sub-carriers independently with sufficient attenuation of the other sub-carriers to enable reliable transmission of data symbols at a predetermined transmission rate. In one mode of operation, the master wireless node 108 is configured to transmit data symbols to each of the slave wireless nodes 108-116 simultaneously using the different orthogonal sub-carriers 120. The slave wireless nodes 108-116 are each configured to receive transmitted symbols from the master wireless node 104 using separate orthogonal sub-carriers 120. In one embodiment, the slave wireless nodes 108-116 also transmit symbols to the master wireless node 104 using either the same sub-carrier 120 that the master 104 uses to transmit to the slave wireless nodes 108-116, respectively, or a different orthogonal sub-carrier.

In the example of FIG. 1, both the master wireless node 104 and each of the slave wireless nodes 108-116 include one or more digital controllers, such as digital microprocessors, microcontrollers, digital signal processors, and the like, in addition to radio transceiver hardware and one or more antennas. In some embodiments, the controller executes stored program instructions portion of the functionality of the radio transceiver in a "software defined radio" embodiment. In one embodiment, the master wireless node and each of the slave wireless nodes use a common implementation for hardware and software. The roles of master wireless node and slave wireless node are assigned dynamically through software and a slave wireless node can be reassigned to act as the master wireless node and the master wireless node can change to operate as a slave wireless node. In one configuration, if the master wireless node becomes inoperable, a slave wireless node in the communication system continues operation as the master wireless node to maintain operation of the communication system.

Figure 2:
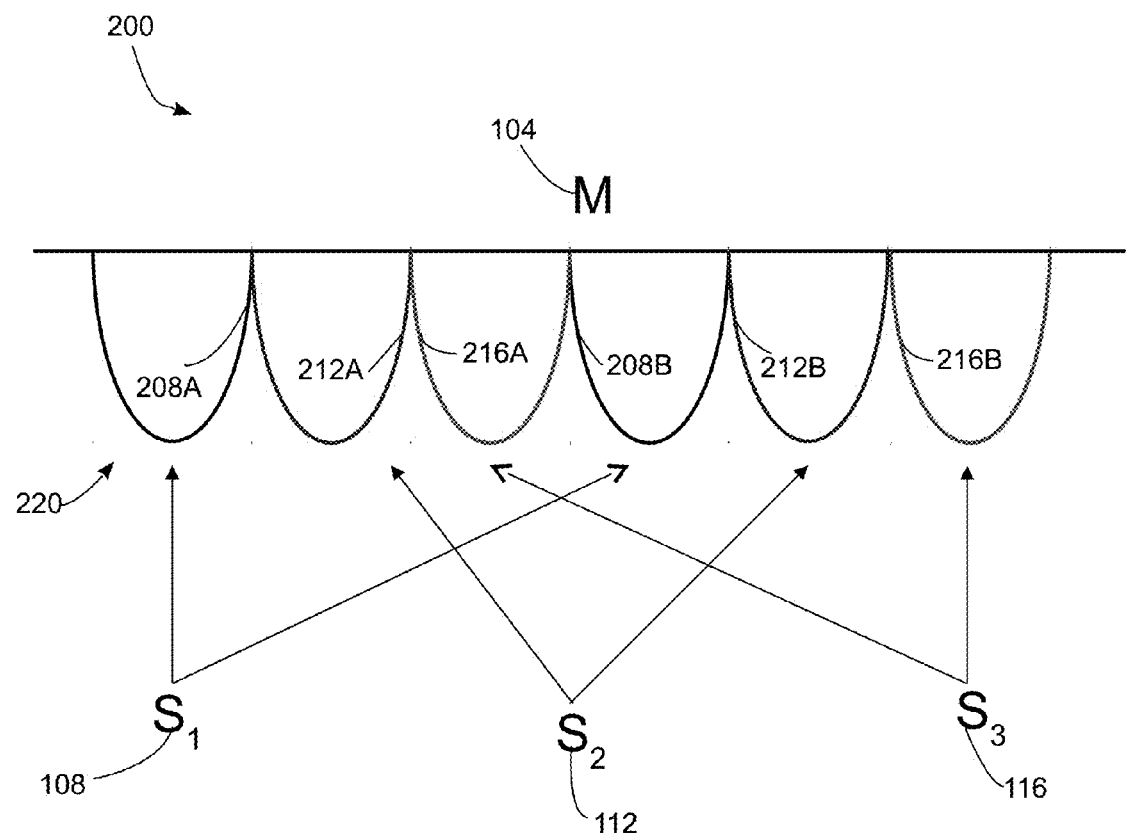
FIG. 2 is another schematic diagram of a wireless communication system.

FIG. 2 depicts another wireless communication system configuration 200 in which the master wireless node 104 and the slave wireless nodes 108-116 communicate using an interleaved arrangement of orthogonal sub-carriers 220. In FIG. 2, the master wireless node 104 communicates with each of the slave wireless nodes 108, 112, and 116 using interleaved orthogonal sub-carriers 208A-208B, 212A-212B, and 216A-216B, respectively. The orthogonal sub-carriers 208A-216B are said to be interleaved because the frequency ranges of the different orthogonal sub-carriers that are assigned to a given one of the slave wireless nodes 108-116 are arranged next to sub-carriers for the other slave wireless nodes in the electromagnetic spectrum. The interleaved arrangement of orthogonal sub-carriers provides additional resistance to noise during operation. For example, if electromagnetic noise in the environment around the system 200 interferes with the sub-carriers 208A and 212A, then the slave wireless nodes 108 and 112 are still able to use the interleaved sub-carriers 208B and 212B, respectively, to communicate with the master wireless node 104.

In any configuration of wireless communications, the master wireless node 104 and slave wireless nodes 108-116 can dynamically reallocate sub-carriers based on measured channel and environmental characteristics such as multipath fading. Additionally, while the slave wireless nodes 108-116 in FIG. 1 and FIG. 2 are depicted as having equal sub-carrier and bandwidth allotments, for some applications the slave wireless nodes receive orthogonal sub-carrier allotments with reference to the expected bandwidth requirements for the individual slave wireless nodes. For example, a slave wireless node that aggregates data from multiple industrial devices and transmits the data to the master wireless node is allocated a larger number of orthogonal sub-carriers than another slave wireless node that transmits smaller amounts of data to the master wireless node. In one embodiment, the master wireless node allocates the sub-carriers to the slave devices. In some configurations, the master wireless node adjusts the allocation of sub-carriers to maintain real-time communication with the slave wireless nodes during different operating modes.

Figure 3:
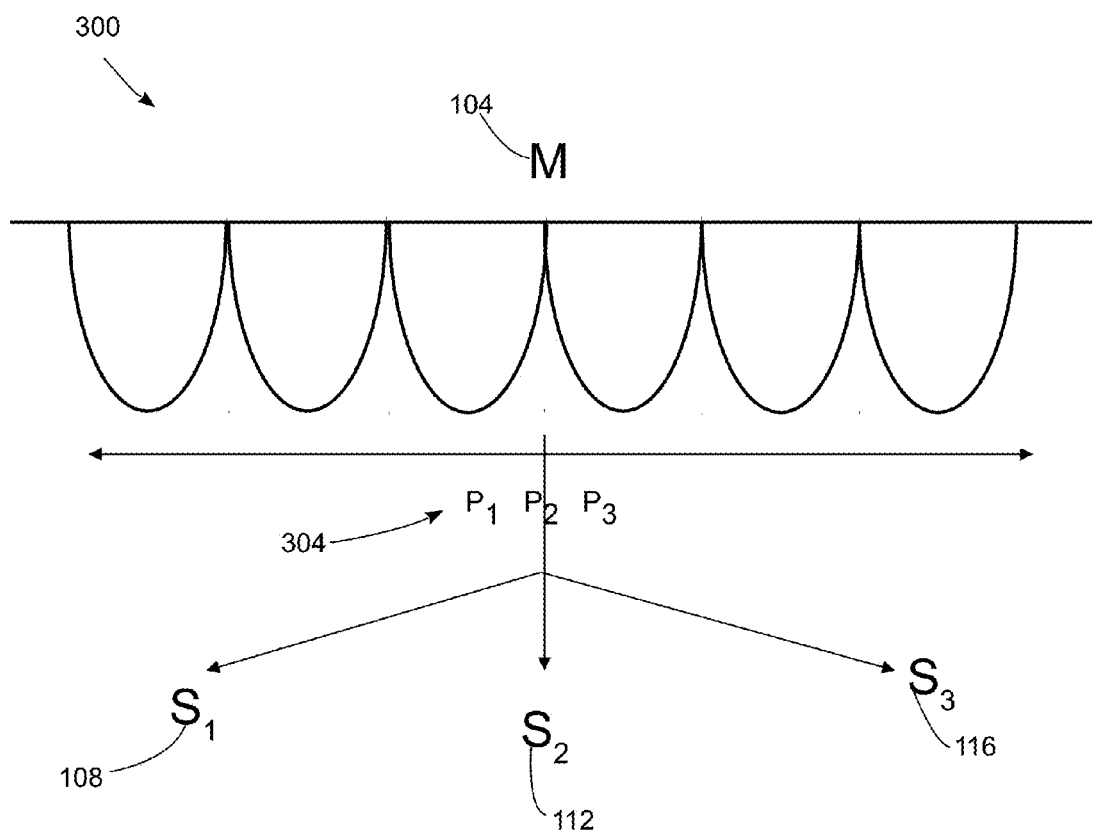
FIG. 3 is another schematic diagram of a wireless communication system.

FIG. 3 depicts another configuration of a wireless network 300 in which the master wireless node 104 is synchronized in time with the slave wireless nodes 108-116. In some embodiments, the OFDMA implementation in industrial networks includes synchronization between the master wireless node 104 and the slave wireless nodes 108-116 to provide hard real-time communication requirements. In some operating modes, the master wireless node 104 communicates with each of the slave wireless nodes during a comparatively short cycle-time. In one embodiment, the master wireless node 104 synchronizes communications with the slave wireless nodes 108-116 using a series of common beacon frames that are transmitted to all of the slave wireless nodes, as depicted in FIG. 3 with the beacon frames 304. The term "beacon frame" refers to a transmission from the master wireless node to one or more slave wireless nodes that is used to transmit synchronization and command data for the operation of the slave wireless node that are different than the typical transmission data for messages that are sent through the wireless communication system. The beacon frame is a broadcast message using all sub-carriers that is sent to all of the slave nodes. The beacon frame message may also contain data for all nodes at pre-determined locations. The common beacon frame method ensures that slave wireless nodes are all synchronized at beginning of each time cycle in a series of predetermined time cycles. In addition, the single beacon frame synchronization method leads to simpler design for the master wireless node as the master wireless node is either receiving or transmitting on all sub-carriers.

Figure 4:
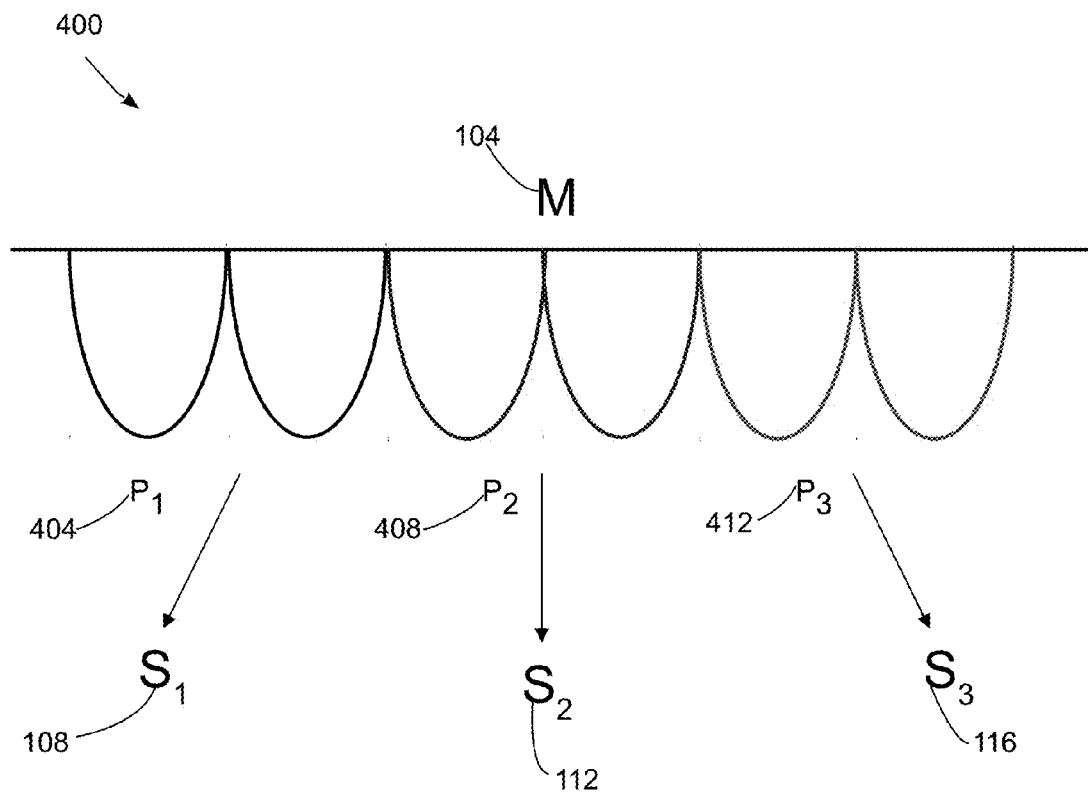
FIG. 4 is another schematic diagram of a wireless communication system.

FIG. 4 depicts another configuration of a wireless network 400 where the master wireless node 104 is synchronized with the slave wireless nodes 108-116 using separate beacon frames for each slave wireless node. In FIG. 4, the master wireless node 104 sends the individual beacon frames 404, 408, and 412 to the individual slave wireless nodes 108, 112, and 116, respectively, using the corresponding sub-carriers for each of the respective slave wireless nodes. In the configuration of FIG. 4, the master wireless node 104 does not require exact synchronization with all of the slave wireless nodes 108-116 to maintain synchronization with any one of the slave wireless nodes 108-116. In the configuration of FIG. 4, the master wireless node 104 may be transmitting data using some sub-carriers while simultaneously receiving data using other sub-carriers. Additionally, the configuration of FIG. 4 does not maintain express synchronization between the slave wireless nodes 108-116. In one embodiment, the configuration of FIG. 4 is used for systems where master and slave are mutually synchronized but slave wireless nodes are not to be synchronized with each other.

Some industrial wireless network configurations require synchronization between the master wireless node and the slave wireless nodes and synchronization among the slave wireless nodes. In another configuration, the master wireless node 104 sends synchronization packets on respective chosen subsets of the sub-carriers for each of the slave wireless nodes 108-116 at the same time. In this configuration, the master wireless node 104 is either listening or transmitting on all sub-carriers at any given time. One advantage of this scheme as compared to the one of transmitting common beacon frames for all nodes is possibly a smaller beacon frame size and the master wireless node 104 does not have to transmit on some sub-carriers while receiving on other sub-carriers.

Figure 5:
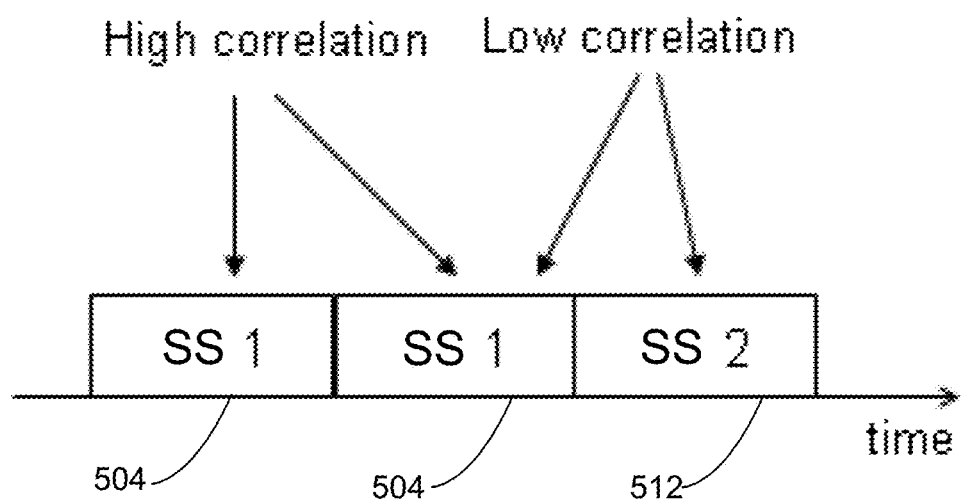
FIG. 5 is a diagram depicting symbols that are used in a preamble to a stream of symbols that are transmitted in a wireless communication system.

FIG. 5 depicts a series of symbols in a preamble that are transmitted between the master wireless node 104 and slave wireless nodes 108-116 in the systems 100-400. The term "preamble" refers to a set of symbols placed at the beginning of individual data frames to enable the receiving nodes to identify whether a communication message is from another node in the wireless communication system or is a spurious transmission. In the systems 100-400, the master wireless node 104 and slave wireless nodes 108-116 are more tightly coupled than in existing wireless data networks in the unlicensed frequency bands such as IEEE 802.11. Therefore, the requirements for preambles are reduced in the systems 100-400. However, in wireless communication networks that operate in unlicensed frequency bands, such as the 2.4 GHz and 5 GHz bands, a small preamble sequence assists in identification and rejection of spurious transmissions.

The preamble includes a plurality of data symbols, which are referred to as "start symbols." In a wireless communication system with a comparatively small number of sub-carriers, the requirements for complex preambles increase. To reduce the number of symbols that are required for use in a preamble, the FIG. 5 depicts a preamble sequence where a predetermined preamble sequence of symbols is repeated twice, followed immediately by a copy of uncorrelated symbols. In FIG. 5, a transmitting node, such as the master wireless node 104 or slave wireless nodes 108-116, transmit a single preamble sequence 504 twice, with no delay between the transmissions of the two preamble sequences 504. The transmitting node then transmits another portion of the preamble 512, which includes low-correlation symbols that are uncorrelated or have a negative correlation to the symbols in the first portion of the preamble 504. The receiving node is configured to correlate the repeated preamble sequences 504 to identify a high-correlation, followed by the low-correlation preamble 512, which results in a drop in the correlation for the preamble symbol sequence. Such a scenario is uncommon in normal data communication, and the nodes in the wireless communication system use change in the preamble correlation to identify that a message is from another node in the communication network and not a spurious transmission. For example, repetition of the predetermined bit sequence 504 forms two high-correlation sequences of bits in the preamble. In one embodiment, the low-correlation bit pattern 512 is generated through an exclusive-or (XOR) operation of the predetermined bit sequence 504 with a corresponding sequence of logical "1" bits. While the preamble is depicted with the high-correlation bit sequences 504 being transmitted first followed by the low-correlation bit sequence 512, in another embodiment the preamble includes the low-correlation bit sequence 512 followed by the high-correlation bit sequences 504.

The low-correlation symbols are selected to be noticeably different than the predetermined pattern of symbols in the high-correlation sequence. The term "correlation" is used herein with the ordinary meaning of the term as used in signal processing and includes auto-correlation, cross-correlation, and other similar operations. More particularly, a cross-correlation between the first and second repetition of the symbols 504 produces a high correlation value (e.g. 1 on a scale of −1 to 1). The cross-correlation of the repeated symbol sequence 504 is also effectively an auto-correlation of the sequence 504 with itself. The second symbol sequence 512 in the preamble is generated to have a low correlation value in relative to the sequences 504 in the preamble (e.g. −1 on the scale of −1 to 1). In the illustrative embodiment, the low-correlation symbols in the preamble refers to a negative correlation to improve detection of the preamble, although in other embodiments the preamble includes a sequence of symbols that are simply uncorrelated to another sequence of high-correlation symbols in the preamble (e.g. 0 on the scale of −1 to 1). The high-correlation and low-correlation sequences in the preamble reduce the probability of a false detection of the preamble sequence.

Figure 6:
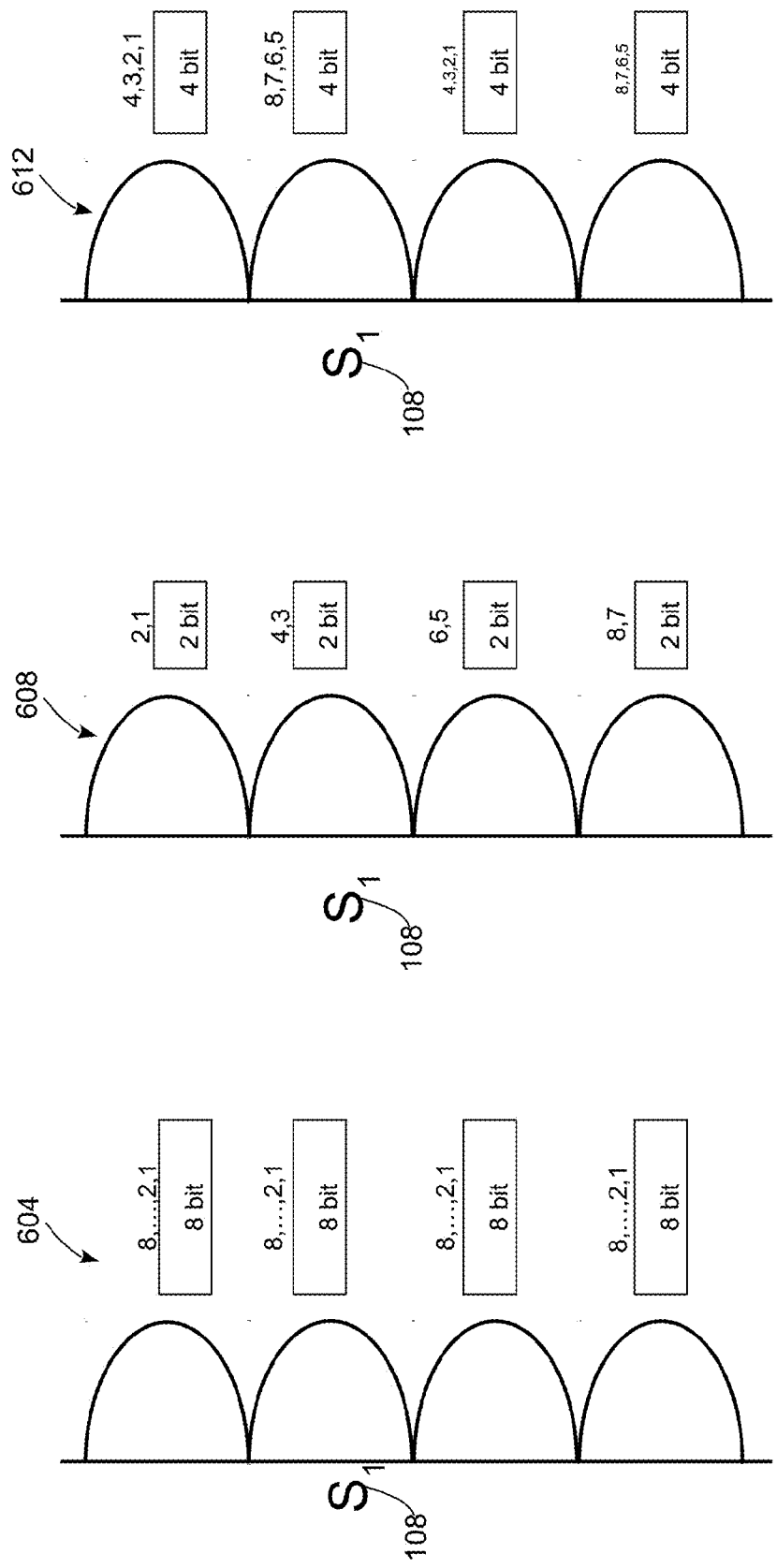
FIG. 6 is a diagram depicting different symbol sizes for transmission from a node in a wireless communication system.

FIG. 6 depicts illustrative symbol transmission configurations for a node, such as the master wireless node 104 or the slave wireless nodes 108-116, in the communication systems 100-400. In the configuration 604, the wireless node transmits and receives 8-bit symbols in each of four sub-carriers, with the wireless node transmitting the same 8-bit symbol to provide redundancy. In the configuration 608, the wireless node transmits and receives 2-bit symbols using the four sub-carriers being used to transmit 2-bits of a larger 8-bit byte. In the configuration 612, the wireless node is configured to transmit 4-bit symbols using four sub-carriers, where two pairs of sub-carriers each transmit the same 4-bit symbols redundantly to transmit an 8-bit byte across all four sub-carriers.

Figure 7:
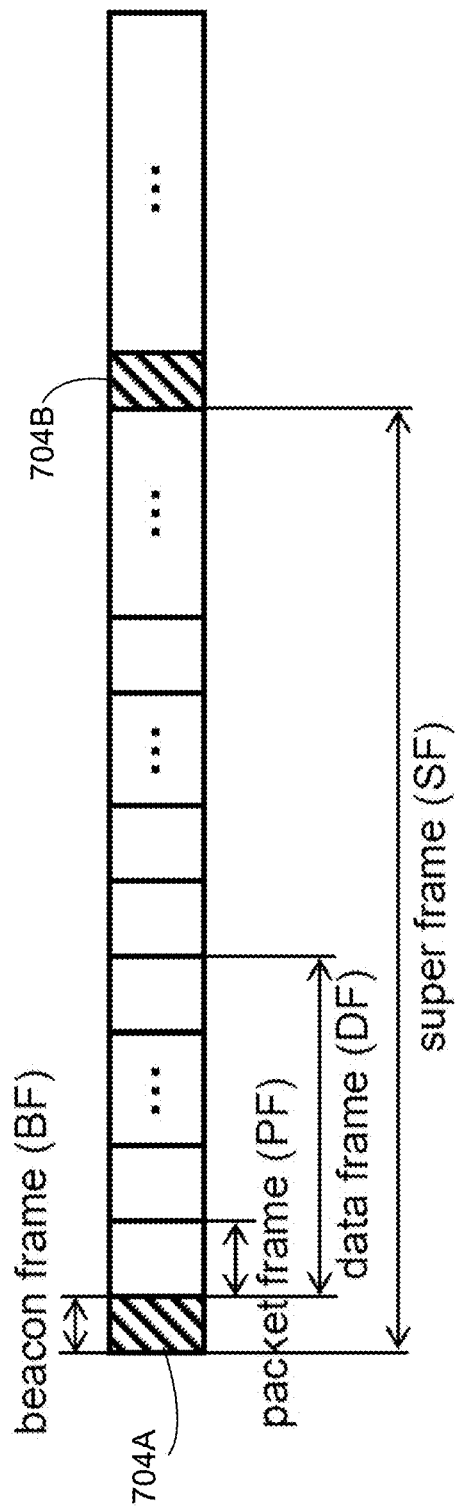
FIG. 7 is a diagram depicting beacon frames and superframes that are used to synchronize wireless data transmissions in a wireless communication system.
Figure 8:
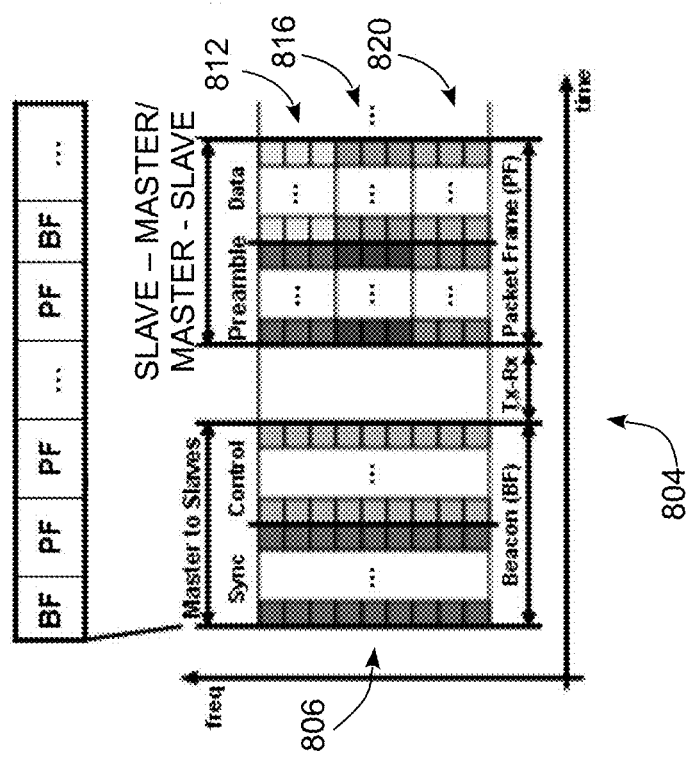
FIG. 8 is a diagram of beacon frame and packet frame transmission in a wireless communication system.

FIG. 7 depicts time slots for transmission of data between master and slave wireless nodes. In FIG. 7 and FIG. 8, each data packet is transmitted in a packet frame (PF). Two or more PFs compose a data frame (DF). The same data packet can be transmitted in multiple PFs within a larger DF. One or more DFs and a beacon frame (BF) compose a super frame (SF). The master wireless node transmits a beacon frame, such as beacon frames 704A and 704B, in each BF. The number of PFs in a DF, denoted by NPF, and the number of DFs in a SF, denoted by NDF, are configurable and the NPF and NDF numbers are encoded in the beacon frame data. As an example, a DF may include of one PF each for all slave wireless nodes, where nodes send their data to the master wireless node. Further, the DF may be repeated several times within the SF for redundancy in wireless network systems that tend to have high rates of packet loss. The beacon frame data also include transmission powers, transmission rates, sub-carrier assignments and timing & frequency offsets for slave wireless nodes. The beacon frame further contains synchronization packets according to one of the fore mentioned mechanisms. In a PF, slave wireless nodes transmit a preamble and subsequently their data packets through one or more of the assigned sub-carriers. To eliminate timing errors, the master and slave wireless nodes add a cyclic prefix (CP) to each sequence of data symbols.

As depicted in FIG. 7, each packet frame corresponds to a fixed-length time slot for transmission of a single set of messages to the slave wireless nodes from the master wireless node where each slave wireless node receives one message. Additionally, one or more of the slave wireless nodes transmits data to the master wireless node during some of the packet frames to enable bidirectional communication. The fixed-length packet frames enable the master wireless node to transmit messages of up to a predetermined number of bits to each slave wireless node during a single packet frame. Longer messages are divided amongst multiple packet frames in a data frame, and messages that require even longer transmission times are split amongst data frames in two or more super frames that are defined by periodic transmissions of the beacon frames to synchronize the master and slave wireless nodes. As described above, the transmission of data can include redundancy at multiple levels to improve the reliability of communication in environments that are subjected to noise and other interference. For example, each packet frame can include redundantly encoded data that are transmitted using different orthogonal sub-carriers as depicted in FIG. 6, or the data in the packet frames are optionally transmitted more than once. The master wireless node and slave wireless nodes can also use error correction codes (ECC) and other error reducing encoding techniques that are known to the art to reduce the error rate during transmission.

Because the master wireless node transmits the beacon frames at regular intervals to the slave nodes, each of the slave nodes has an opportunity to receive data from the master wireless node and transmit data to the master wireless node during each super frame between the transmissions of the beacon frames. Consequently, each of the nodes in the wireless communication system can communicate during each super frame, which provides a maximum bound on the latency for how long a given wireless node needs to wait before transmitting data. The configuration of the master wireless node to transmit beacon frames at different intervals and to control the number and timing of packet frames during each super frame enables adjustment of the maximum latency based on the requirements for communication in the wireless network.

For example, in one configuration the master wireless node 104 generates two different messages 404 and 408 for the slave wireless nodes 108 and 112, respectively. The content of the messages 404 and 408 are different for each slave wireless node, but both the messages 404 and 408 are generated with a number of bits that the master wireless node 104 can transmit to the slave wireless nodes 108 and 112 within the period of a single packet frame. In some embodiments, the master wireless node generates each packet frame for each slave wireless node with a predetermined number of bits, and optionally includes padding bits if the content of a message is less than the number of bits in the packet frame. The transmission time for each packet frame to from the master wireless node to each of the slave wireless nodes is substantially equal since the master wireless node begins and ends the transmissions to multiple slave wireless nodes concurrently. The predetermined number of bits for a maximum length of a packet frame depends upon the effective rate of symbol transmission to each of the slave wireless nodes over the orthogonal frequency sub-carriers.

FIG. 8 depicts a graph 804 of a transmission scheme for master-to-slave and slave-to-master communication. In the graph 804, the slave wireless nodes communicate with the master wireless node during one or more packet frames of a larger super frame. The graph 804 depicts a configuration where the master wireless node and the slave wireless nodes transmit during one or more of the packet frames. As depicted in the graph 804, the master wireless node transmits the beacon frame 808 that includes both synchronization data and command data to control the operation of the slave wireless nodes. The beacon frame is sent on all of the available sub-carriers to all of the slave wireless nodes in the wireless communication system. While FIG. 8 depicts an embodiment where the master wireless node transmits a single beacon frame to all of the slave nodes, in the embodiment of FIG. 4 depicted above the master wireless node transmits separate beacons to individual slave wireless nodes using the allotted orthogonal sub-carriers for each slave wireless node. In the graph 804, the slave wireless nodes transmit data to the master wireless node during one or more of the packet frames. Since the slave wireless nodes use different orthogonal sub-carriers, multiple slave wireless nodes transmit to the master wireless node during a single packet frame as depicted by the message data 812, 816, and 820, which can be different for each slave wireless node. Thus, each of the slave wireless nodes can communicate with the master wireless node during a single packet frame. Each of the messages begins with a preamble, such as the preamble that is depicted in FIG. 5.

The master wireless node also communications with each of the slave wireless nodes in a similar manner to the slave-to-master communication depicted in FIG. 8. In particular, the master wireless node transmits during a data frame using the preamble followed by message data for each of the slave wireless nodes using the different orthogonal sub-carriers that are assigned to each slave wireless node to enable the master wireless node to transmit different sets of data to each of the slave wireless nodes during a single packet frame. In one embodiment, the control data that the master wireless controller transmits to the slave wireless nodes in each beacon frame includes identifiers for the packet frames that the master wireless node has reserved for transmission to the slave wireless nodes and the packet frames that are available for the slave wireless nodes to transmit to the master wireless node to avoid collisions when the master wireless node and the slave wireless nodes transmit simultaneously. In another embodiment, the master wireless node communicates with the slave wireless nodes using a first set of orthogonal sub-carriers for communication with the slave wireless nodes, and the control data in the beacon frame to the slave wireless nodes includes a second set of orthogonal sub-carriers that the slave wireless nodes use to communicate with the master wireless node. In an embodiment where the master-to-slave and slave-to-master communications use different sets of orthogonal sub-carriers, the master wireless nodes can transmit to the slave wireless nodes while the slave wireless nodes transmit to the master wireless node concurrently during a single packet frame.

During each packet frame, the master wireless node searches preambles that are received from one or more of the slave wireless nodes to identify if one or more of the slave wireless nodes are transmitting during the packet frame. In one embodiment, the slave wireless nodes use the preamble sequence including a repeated set of high-correlation bits followed by low-correlation bits that is depicted in FIG. 5. The master wireless node calculates frequency and timing offsets of the corresponding slave wireless node in response to identifying the preamble. The master wireless node uses the identified offsets to compensate for errors in subsequent data symbols. As mentioned above, the offsets are appended on a beacon frame so that slave wireless nodes finely tune their timing and frequency. Further, slave wireless nodes also estimate timing and frequency errors and adapt accordingly to the master wireless node. After receiving preambles, the master wireless node receives data symbols from all sub-carriers and packetizes the data symbols into different packets according to the sub-carrier assignments. Thus, the master wireless node is configured to receive data packets from all slave wireless nodes simultaneously.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for wireless communication comprising:
   generating with a first controller in a master wireless node a first allotment of sub-carriers selected from a predetermined frequency band for communication with a first slave wireless node, the first allotment of sub-carriers including at least two orthogonal sub-carriers;
   generating with the first controller in the master wireless node a second of allotment of sub-carriers selected from the predetermined frequency band for communication with a second slave wireless node, the second allotment of sub-carriers including at least two orthogonal sub-carriers that are different than the at least two orthogonal sub-carriers in the first allotment;
   transmitting with a first transceiver in the master wireless node a first message to the first slave wireless node using only the first allotment of sub-carriers and a second message to the second slave wireless node using only the second allotment of sub-carriers, the first message being different than the second message and the transmission of the first message and the second message occurring substantially simultaneously;
   generating with a second controller in the first slave wireless node a third message for transmission to the master wireless node; and
   transmitting with a second transceiver in the first slave wireless node a preamble to the master wireless node followed immediately by the third message using the first allotment of sub-carriers, the preamble including a first predetermined sequence of symbols, a repetition of the first predetermined sequence of symbols, and a second predetermined sequence of symbols having a low correlation to the first predetermined sequence of symbols.

2. The method of claim 1 the generation of the first allotment of sub-carriers further comprising:
   selecting with the first controller in the master wireless node two sub-carriers for the first allotment of sub-carriers in the predetermined frequency band having a plurality of sub-carriers in which a first sub-carrier in the first allotment of sub-carriers is separated from a second sub-carrier in the first allotment of sub-carriers by at least one other sub-carrier in the plurality of sub-carriers in the predetermined frequency band.

3. The method of claim 2 the generation of the second allotment of sub-carriers further comprising:
   selecting with the first controller in the master wireless node the at least one other sub-carrier in the plurality of sub-carriers that separates the first sub-carrier in the first allotment of sub-carriers and the second sub-carrier in the first allotment of sub-carriers as one of the sub-carriers for the second allotment of sub-carriers.

4. The method of claim 2 further comprising:
   transmitting with the first transceiver in the master wireless node the first message and the second message with a transmission time for the first message and the second message being substantially equal.

5. The method of claim 1 further comprising:
   generating with the first controller in the master wireless node a beacon frame; and
   transmitting with the first transceiver in the master wireless node the beacon frame to the first slave wireless node and the second slave wireless node, using both the first allotment of sub-carriers and the second allotment of sub-carriers, to synchronize the first slave wireless node and the second slave wireless node.

6. The method of claim 1 further comprising:
generating with a third controller in the second slave wireless node a fourth message for transmission to the master wireless node; and
transmitting with a third transceiver in the second slave wireless node the preamble to the master wireless node followed immediately by the fourth message using the second allotment of sub-carriers, the transmitting of the fourth message by the second slave wireless node occurring substantially simultaneously to the transmission of the third message by the first slave wireless node.

7. The method of claim 1, the transmission of the first message from the master wireless node to the first slave wireless node further comprising:
transmitting with the first transceiver in the master wireless node a first symbol in the first message using a first orthogonal sub-carrier and a second orthogonal sub-carrier in the at least two orthogonal sub-carriers of the first allotment to transmit the first symbol to the first slave wireless node with both the first and second orthogonal sub-carriers.

8. A wireless communication system comprising:
a first slave wireless node;
a second slave wireless node; and
a master wireless node, the master wireless node comprising:
a first transceiver configured to transmit data to the first slave wireless node and the second slave wireless node and receive data from the first slave wireless node and the second slave wireless node; and
a first controller operatively connected to the first transceiver, the first controller being configured to:
generate a first allotment of sub-carriers selected from a predetermined frequency band for communication with the first slave wireless node, the first allotment of sub-carriers including at least two orthogonal sub-carriers;
generate a second of allotment of sub-carriers selected from the predetermined frequency band for communication with the second slave wireless node, the second allotment of sub-carriers including at least two orthogonal sub-carriers that are different than the at least two orthogonal sub-carriers in the first allotment; and
transmit a first message to the first slave wireless node using only the first allotment of sub-carriers and a second message to the second slave wireless node using only the second allotment of sub-carriers, the first message being different than the second message and the transmission of the first message and the second message occurring substantially simultaneously; and
the first slave wireless node further comprising:
a second transceiver configured to transmit data to the master wireless node and receive data from the master wireless node; and
a second controller operatively connected to the second transceiver, the second controller being configured to:
generate a third message for transmission to the master wireless node; and
transmit a preamble to the master wireless node followed immediately by the third message using the first allotment of sub-carriers, the preamble including a first predetermined sequence of symbols, a repetition of the first predetermined sequence of symbols, and a second predetermined sequence of symbols having a low correlation to the first predetermined sequence of symbols.

9. The system of claim 8, the first controller being further configured to:
select two sub-carriers for the first allotment in the predetermined frequency band having a plurality of sub-carriers in which a first sub-carrier in the first allotment of sub-carriers is separated from a second sub-carrier in the first allotment of sub-carriers by at least one other sub-carrier in the plurality of sub-carriers in the predetermined frequency band.

10. The system of claim 9, the first controller being further configured to:
select the at least one other sub-carrier in the plurality of sub-carriers that separates the first sub-carrier in the first allotment of sub-carriers and the second sub-carrier in the first allotment of sub-carriers as one of the sub-carriers for the second allotment of sub-carriers.

11. The system of claim 9, the first controller being further configured to:
transmit the first message and the second message with a transmission time for the first message and the second message being substantially equal.

12. The system of claim 8, the first controller being further configured to:
generate a beacon frame; and
transmit the beacon frame to the first slave wireless node and the second slave wireless node, using both the first allotment of sub-carriers and the second allotment of sub-carriers, to synchronize the first slave wireless node and the second slave wireless node.

13. The system of claim 8, the second slave wireless node further comprising:
a third transceiver configured to transmit data to the master wireless node and receive data from the master wireless node; and
a third controller operatively connected to the third transceiver, the third controller being configured to:
generate a fourth message for transmission to the master wireless node; and
transmit the preamble to the master wireless node followed immediately by the fourth message using the second allotment of sub-carriers, the transmitting of the fourth message by the second slave wireless node occurring substantially simultaneously to the transmission of the third message by the first slave wireless node.

14. The system of claim 8, the first controller being further configured to:
transmit a first symbol in the first message using a first orthogonal sub-carrier and a second orthogonal sub-carrier in the at least two orthogonal sub-carriers of the first allotment to transmit the first symbol to the first slave wireless node with both the first and second orthogonal sub-carriers.

* * * * *